(12) United States Patent
Johnson et al.

(10) Patent No.: US 7,351,593 B1
(45) Date of Patent: Apr. 1, 2008

(54) METHOD OF IMPROVING ON-CHIP POWER INDUCTOR PERFORMANCE IN DC-DC REGULATORS

(75) Inventors: Peter Johnson, Sunnyvale, CA (US); Peter J. Hopper, San Jose, CA (US); Kyuwoon Hwang, Palo Alto, CA (US); Robert Drury, Palo Alto, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 323 days.

(21) Appl. No.: 11/137,767

(22) Filed: May 25, 2005

Related U.S. Application Data

(63) Continuation-in-part of application No. 11/111,660, filed on Apr. 21, 2005, and a continuation-in-part of application No. 11/041,658, filed on Jan. 24, 2005, now Pat. No. 7,268,410.

(51) Int. Cl.
*H01L 21/00* (2006.01)
*H01L 29/76* (2006.01)

(52) U.S. Cl. .......................................... 438/3; 257/295

(58) Field of Classification Search ................. 438/3; 257/295
See application file for complete search history.

(56) References Cited

U.S. PATENT DOCUMENTS

| | | | |
|---|---|---|---|
| 6,429,651 B1 * | 8/2002 | Choi et al. | 324/249 |
| 6,495,019 B1 * | 12/2002 | Filas et al. | 205/119 |
| 6,573,818 B1 | 6/2003 | Klemmer et al. | 336/83 |
| 7,140,092 B2 * | 11/2006 | Park et al. | 29/602.1 |
| 2003/0070282 A1 * | 4/2003 | Hiatt et al. | 29/602.1 |
| 2004/0149585 A1 * | 8/2004 | Wong | 205/118 |
| 2005/0082171 A1 * | 4/2005 | Osaka et al. | 205/89 |

* cited by examiner

*Primary Examiner*—Kevin M Picardat
(74) *Attorney, Agent, or Firm*—Stallman & Pollock LLP

(57) ABSTRACT

A method is provided for forming the ferromagnetic core of an on-chip inductor structure. In accordance with the method, a static, permanent magnet is placed in proximity to a semiconductor wafer upon which the ferromagnetic core is being electroplated. The permanent magnet is place such that the magnetic field is orthogonal to the wafer. The "easy" axis material is that plated parallel parallel to the magnet's field and saturates at a lower applied field. The "hard" axis is that plated perpendicular to the applied magnetic filed and saturates later, at a higher current level. This plating approach results in optimum magnetic alignment of the ferromagnetic core so as to maximize both the field strength/magnetic flux slope and magnitude before magnetic material saturation occurs.

5 Claims, 2 Drawing Sheets

METHOD OF IMPROVING ON-CHIP POWER INDUCTOR PERFORMANCE IN DC-DC REGULATORS

RELATED APPLICATIONS

This application is a Continuation-In-Part of co-pending and commonly assigned application Ser. No. 11/111,660, filed on Apr. 21, 2005, by Kyuwoon Hwang, Peter J. Hopper, Robert Drury and Peter Johnson, titled "Patterned Magnetic Layer On-Chip Conductor." application Ser. No. 11/111,660 is hereby incorporated by reference in its entirety.

This application is also a Continuation-In-Part of co-pending and commonly assigned application Ser. No. 11/041,658, filed on Jan. 24, 2005, by Peter J. Hopper, Peter Johnson, Kyuwoon Hwang and Robert Drury, titled "Integrated Switching Voltage Regulator Using Copper Process Technology." application Ser. No. 11/041,658 is hereby incorporated by reference in its entirety.

TECHNICAL FIELD

The present invention relates to integrated circuit structures and, in particular, to a manufacturing friendly, low cost method of improving high field inductance in DC-DC switching regulators utilizing a static permanent magnet in the fabrication of the on-chip inductor.

DESCRIPTION OF THE INVENTION

In the past, the inductors utilized in some integrated circuit (IC) applications were discrete devices that were then electrically connected to the IC for a particular application. However, as integrated circuit structures have become smaller, it has become necessary to form the inductors, such as those utilized with integrated circuits for power management and wireless signal processing applications, on-chip. Above-referenced related application Ser. No. 11/041,658 discloses the utilization of an on-chip inductor in a fully integrated DC-DC switching regulator circuit.

U.S. Pat. No. 6,573,818, issued on Jun. 3, 2003, to Klemmer et al., also discloses a thin film, planar spiral inductor structure for use on-chip. U.S. Pat. No. 6,573,818 is hereby incorporated by reference in its entirety to provide background information regarding the present invention. However, for a minimal resistance specification, the value of inductance (nH) of a simple loop of metal, as taught by the '818 patent, is too low for this application. This necessitates the utilization of an ferromagnetic material to as the inductor core, as disclosed in related application Ser. No. 11/041,658.

Above-referenced related application Ser. No. 11/111,660 discloses an on-chip inductor structure that includes conductor cells that are sandwiched between top and bottom ferromagnetic core layers that are patterned to reduce eddy currents.

The present invention provides a method for obtaining the optimum magnetic alignment of the ferromagnetic core of an on-chip inductor structure utilizing a permanent magnet in the fabrication of the inductor structure. Utilization of the method of the invention results in maximization of the field strength and magnetic flux slope and magnitude before magnetic material saturation occurs. This leads to a further maximized inductance and provides, in turn, for a more efficient, lower-cost switching regulator design.

The features and advantages of the present invention will be more fully understood upon consideration of the following detailed description of the invention and the accompanying drawings.

Figure 1:
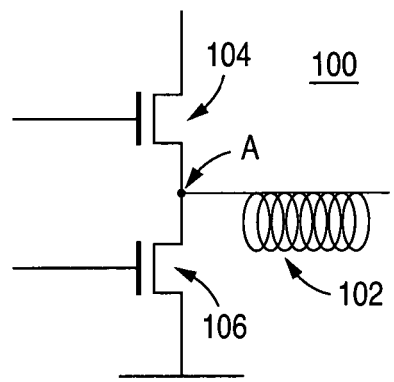
FIG. 1 is a circuit drawing illustrating a DC-DC switching regulator's inductor driven by a pair of transistors.

FIG. 1 is a simple circuit schematic drawing that shows a conventional DC-DC switching regulator circuit 100 that includes an inductor 102 that is driven by a pair of MOS transistors 104, 106. The switching node is identified by "A" in FIG. 1. The inductor 102 is energized by a switching current that, in turn, leads to a switching magnetic field in the ferromagnetic material. As discussed in greater detail below, magnetic domains in the ferromagnetic field are aligned to the field of the inductor 102.

Figure 2:
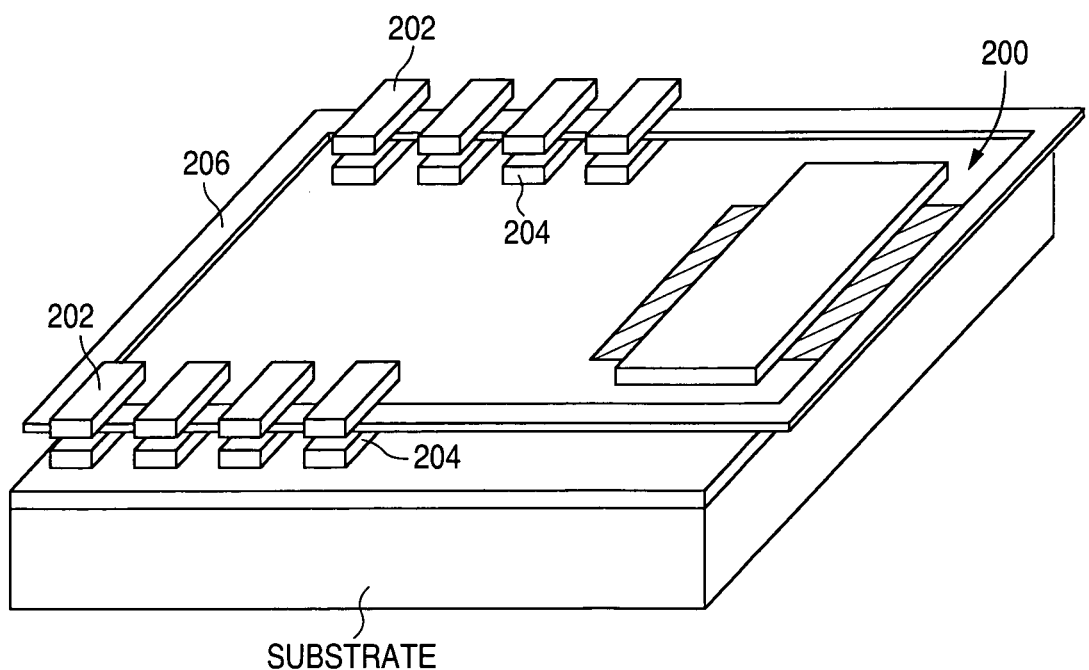
FIG. 2 is a schematic drawing illustrating an embodiment of the utilization of ferromagnetic blocks in an on-chip inductor structure in accordance with the present invention.

An embodiment of a physical implementation of the ferromagnetic core material in a switching regulator circuit application is shown in the FIG. 2 schematic drawing. The large block 200 at the left side of the FIG. 2 drawing represents a conventional switching transistor structure, which, as will be appreciated by those skilled in the art, can comprise two switching transistors as shown in FIG. 1 or a single switching transistor. The smaller blocks represent the upper sections 202 and lower sections 204 of the ferromagnetic core material. As shown in the FIG. 2 embodiment, both the upper core material 202 and the lower core material 204 are patterned, as disclosed in related application Ser. No. 11/111,660, to reduce eddy currents.

Preferably, the top and bottom patterned magnetic plates 202, 204 are an electroplated ferromagnetic material such as Permalloy (with ratios of 20:80 to 80:20 Ni:Fe). The material for the magnetic plates may also be selected from the group consisting of FeCrB, ZrCrTa, CoCr, CoFeNi, or other materials that are known by those skilled in the art as suitable for this application. The thickness of the magnetic plates 202, 204 is preferably about 0.5-1000 microns. The conductor coil 206 is preferably copper about 0.5-1000 microns thick.

Figure 3:
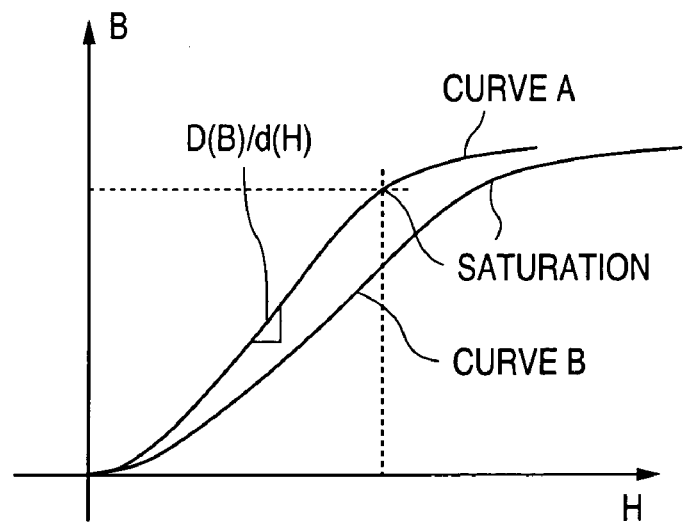
FIG. 3 is a graph that plots the B-H curve relationship for a first inductor core material A and a second inductor core material B.

Referring to FIG. 3, Curve A and Curve B show, respectively, the B-H curve relationship for two core materials. Curve A is that of a magnetic core material that saturates early. Curve B is that of a magnetic core material that saturates later, as a function of H-field. For a large switching regulator current specification, the optimum characteristic would be that whereby the "knee" of the curve occurs at the maximum current point. Thus, the inductance is maintained (L relates to $d(B)/d(H)$). The difference between Curve A and Curve B can be produced by aligning the ferromagnetic domains during the electroplating deposition process for the core material. Domains can be aligned by applying an external magnetic field.

Figure 4:
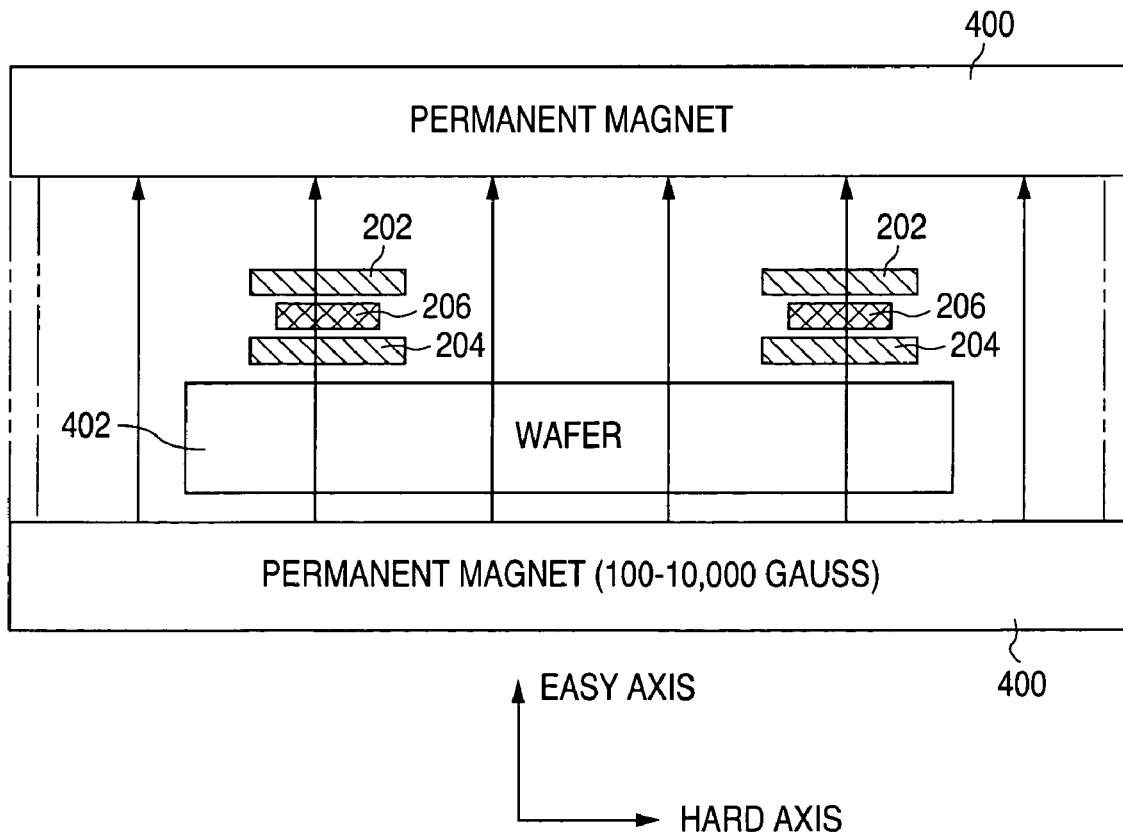
FIG. 4 is schematic drawing illustrating a permanent magnet placed in proximity to an on-chip inductor structure in accordance with the present invention.

FIG. 4 shows an embodiment of an electroplating system for depositing the ferromagnetic core material 202, 204 (FIG. 2) utilized in an on-chip inductor structure in accordance with the present invention. As shown in FIG. 4, in accordance with the invention, a static, permanent magnet 400 is placed in proximity to an integrated circuit wafer 402 being plated. The "easy" axis material is that plated parallel to the field of the permanent magnet 400 and saturates at a lower applied field, i.e. Curve A in FIG. 3. The "hard" axis material is that plated perpendicular to the applied field of the permanent magnet 400 and saturates later, at a higher current level, i.e. Curve B in FIG. 3.

Others have adopted a similar approach to modifying the anisotropy of the magnetic domains. But, due to the fact that the primary driving force was the magnetic head industry, and that a magnetic head is oriented at 90° to that of the integrated inductor structure described above, the external magnetic applied fields in those applications had to come from the edges of the wafer, laterally. Thus, the tool configuration for plating magnetic heads involved large lateral magnetic coils place on either side of the flat wafer and running in the plane of the wafer. Conversely, for the DC-DC switching regulator application disclosed herein, and as shown in FIG. 4, creating an external applied magnetic field orthogonal to the plane of the wafer provides for an optimum inductor design in accordance with the concepts of the present invention. Electroplating techniques and integrated circuit fabrication techniques well known to those skilled in the art may be utilized in forming the upper and lower magnetic plates 202, 204 and the conductor core 206.

It should also be understood that the particular embodiments of the invention described above have been provided by way of example and that other modifications may occur to those skilled in the art without departing from the scope and spirit of the invention as expressed in the appended claims and their equivalents.

What is claimed is:

1. A method of forming magnetic material on a substrate layer, the method comprising:
   providing a permanent magnet in proximity to the substrate layer such that the magnetic field created by the permanent magnet is orthogonal to a substantially planar surface of the substrate layer;
   forming a layer of magnetic material on the substantially planar surface.

2. A method as in claim 1, and wherein the magnetic material is a ferromagnetic material.

3. A method as in claim 2, and wherein the magnetic material is electroplated Permalloy.

4. A method as in claim 1, and wherein the magnetic material is selected from the group consisting of Permalloy, FeCrB, ZrCrTa, CoCr and CoFeNi.

5. A method of fabricating a switching regulator circuit on a semiconductor substrate, the method comprising;
   forming a switching transistor structure on a substantially planar surface of the semiconductor substrate;
   forming an inductor structure on the semiconductor substrate, the inductor structure being connected to the switching transistor structure, the inductor structure including upper and lower magnetic plates and a conductor core formed between the upper and lower magnetic plates, and
   wherein the upper and lower magnetic plates are electroplated in the presence of a magnetic field that is orthogonal to the substantially planar surface of the semiconductor substrate.

\* \* \* \* \*